United States Patent
Fulbright

(10) Patent No.: US 6,365,098 B1
(45) Date of Patent: Apr. 2, 2002

(54) PHOENIX-1, A STRUCTURAL MATERIAL BASED ON NUCLEAR ISOTOPIC CONCENTRATIONS OF SILICON

(75) Inventor: Douglas Bruce Fulbright, 2380 W. College Ave., York, PA (US) 17404

(73) Assignee: Douglas Bruce Fulbright, San Juan, CA (US)

(*) Notice: Subject to any disclaimer, the term of this patent is extended or adjusted under 35 U.S.C. 154(b) by 0 days.

(21) Appl. No.: 09/681,163

(22) Filed: Feb. 5, 2001

(51) Int. Cl.$^7$ .............................................. C22C 29/00
(52) U.S. Cl. ....................................... 420/578; 420/590
(58) Field of Search .................................. 420/578, 590

(56) References Cited

FOREIGN PATENT DOCUMENTS

JP    2000345342    * 12/2000

OTHER PUBLICATIONS

Orlov, V. Yu.; Zhavoronkov, N.M., Separation of Isotapes of Silicon by the Method of Rectification of Silicon Tetrachloride, Zhur. Priklad. Khim. (1956), 29, 959–60 (Abstract Only).*

Reynolds, John H., The Isotopic Constitution of Silicon, Germanium, and Hafnium, Phys. Rev. (1953), 90, 1047–9 (Abstract Only).*

Inghram, Mark G., The Isotopic Constitutions of Tungsten Silicon, and Boron, Phys. Rev. (1946), 70, 653–60 (Abstract Only).*

* cited by examiner

*Primary Examiner*—Sikyin Ip

(57) ABSTRACT

The technology of altering nuclear, chemical, physical and electrical characteristics of a material by changing isotopic concentrations is not new. It has been used for many years primarily in nuclear reactor fuel enrichments and in production of radioactive isotopes. What is new, with regard to Phoenix 1, is the manipulation of the isotopic concentrations of silicon within certain ranges to obtain a lightweight, high strength material that will withstand temperatures in excess of 1000 degrees C and can be used in structural application. Phoenix-1 is a structural material comprising, % by weight, 20–40% isotope Si-28, 30–50% isotope Si-29, 20–40% isotope Si-30 with trace amounts of gold, silver, nickel, carbon, zinc, germanium and copper to enhance the physical properties in the material.

1 Claim, No Drawings

PHOENIX-1, A STRUCTURAL MATERIAL BASED ON NUCLEAR ISOTOPIC CONCENTRATIONS OF SILICON

COPYRIGHT STATEMENT

A Copyright dated Sep. 16, 2000 describing this material is on file with the United States Library of Congress Copyright Office; 101 Independence Ave, SE Washington DC 20559-6000.

DETAILED DESCRIPTION

Phoenix-1 is a mixture of silicon isotopes that takes advantage of the 0, +1, & 0 nuclear spin parity variation of Silicon isotopes 28, 29 and 30 to slightly relax the bonding in the basic diamond cubic structure associated with silicon based materials. This change in bonding will provide material with sufficient ductility and malleability to produce a lightweight and high strength structural material that is workable in a manufacturing environment. Additionally this material is a metalloid and has simi-conducting properties that have the potential to result in decreased friction coefficients as a result of resonance frequency application using an external excitation source. This material will also withstand temperatures of the order of several thousand degrees F.

To achieve OPTIMUM atomic packing and to produce bonding characteristics that will in turn produce desired mechanical, electrical, chemical & nuclear properties the following isotopic mixture is required: Isotope Silicon-28: 26.5%, Isotope Silicon-29: 43.3%; Isotope Silicon 30: 30.2%.

Manufacture of a 5 gram wafer of this material will require 1.325 grams of SI-28, 2.165 grams of SI-29 and 1.510 grams of SI-30. Up to 1% impurities can be tolerated without severe adverse effects although this will need to be adjusted depending on application. That is, physical properties of the Phoenix - 1 material can be enhanced by including trace amounts of gold, silver, nickel, carbon, zinc, germanium and copper. During manufacture, temperatures are to be controlled such that the basic crystalline structure is not perturbed.

While the above will produce a material of optimum characteristics for foil-like material, mixtures of basically 30% SI-28, 40% SI-29 and 30% SI-30 will produce similar results. Although that isotopic mix will not produce material that is as workable from a manufacturing standpoint there are structural applications and those variations are to be included as part of this patent. Therefore this patent will cover a range of silicon isotopic mixtures consisting of SI-28 ranging from 20%–40% when mixed with SI-29 with a range from 30%–50% and then mixed with SI-30 with a range from 20%–40%, and with trace amounts of other materials as indicated above.

The technology of altering nuclear, chemical, physical and electrical characteristics of a material by changing isotopic concentrations is not new it has been used for many years primarily in nuclear reactor fuel enrichments and in production of radioactive isotopes. What is new, and what I am claiming patent for, is manipulating the isotopic concentrations of silicon within certain ranges to obtain a lightweight, high strength material that will withstand temperatures in excess of 1000 degrees C.

What is claimed is:

1. Phoenix-1 is a structural material comprising, % by weight, 20–40% isotope Si-28, 30–50% isotope Si-29, 20–40% isotope Si-30 with trace amounts of gold, silver, nickel, carbon, zinc, germanium and copper to enhance the physical properties in the material.

* * * * *